(12) United States Patent
Sierra et al.

(10) Patent No.: US 11,965,552 B2
(45) Date of Patent: Apr. 23, 2024

(54) BEARING ASSEMBLY FOR ROLLER BOOT ARRANGEMENT

(71) Applicant: SCHAEFFLER TECHNOLOGIES AG & CO. KG, Herzogenaurach (DE)

(72) Inventors: Kleberson Sierra, Sorocaba (BR); Elias Ferreira Machado, Sorocaba (BR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 12 days.

(21) Appl. No.: 17/749,777

(22) Filed: May 20, 2022

(65) Prior Publication Data

US 2023/0375042 A1 Nov. 23, 2023

(51) Int. Cl.
*F16C 33/46* (2006.01)
*F16C 19/36* (2006.01)

(52) U.S. Cl.
CPC .......... *F16C 33/4605* (2013.01); *F16C 19/36* (2013.01)

(58) Field of Classification Search
CPC ... F16C 33/4605; F16C 33/588; F16C 33/605
See application file for complete search history.

(56) References Cited

U.S. PATENT DOCUMENTS

| 4,869,604 A * | 9/1989 | Hill ...................... F16C 33/588 |
| | | 384/564 |
| 5,458,421 A | 10/1995 | Giese |
| 10,995,793 B1 | 5/2021 | Sierra |
| 2001/0006566 A1 | 7/2001 | Akamatsu et al. |
| 2018/0163784 A1* | 6/2018 | Wollboldt ............... F16K 1/224 |

FOREIGN PATENT DOCUMENTS

| DE | 966285 | * | 8/1957 |
| DE | 4230965 A1 | | 3/1994 |
| DE | 102010014742 A1 | | 10/2011 |
| DE | 102020114132 | * | 12/2021 |
| FR | 2558548 A1 | | 7/1985 |
| JP | 2004316671 A | | 11/2004 |

* cited by examiner

*Primary Examiner* — James Pilkington
(74) *Attorney, Agent, or Firm* — Volpe Koenig

(57) ABSTRACT

A bearing assembly is disclosed herein that is configured for use in a rubber boot arrangement. The bearing assembly includes an outer ring, an inner ring, a plurality of rolling elements supported between the outer ring and the inner ring, and a cage configured to retain the plurality of rolling elements. A seal assembly is provided that includes at least one sealing element and a seal insert that is configured to define a first axial stop face for the cage.

18 Claims, 10 Drawing Sheets

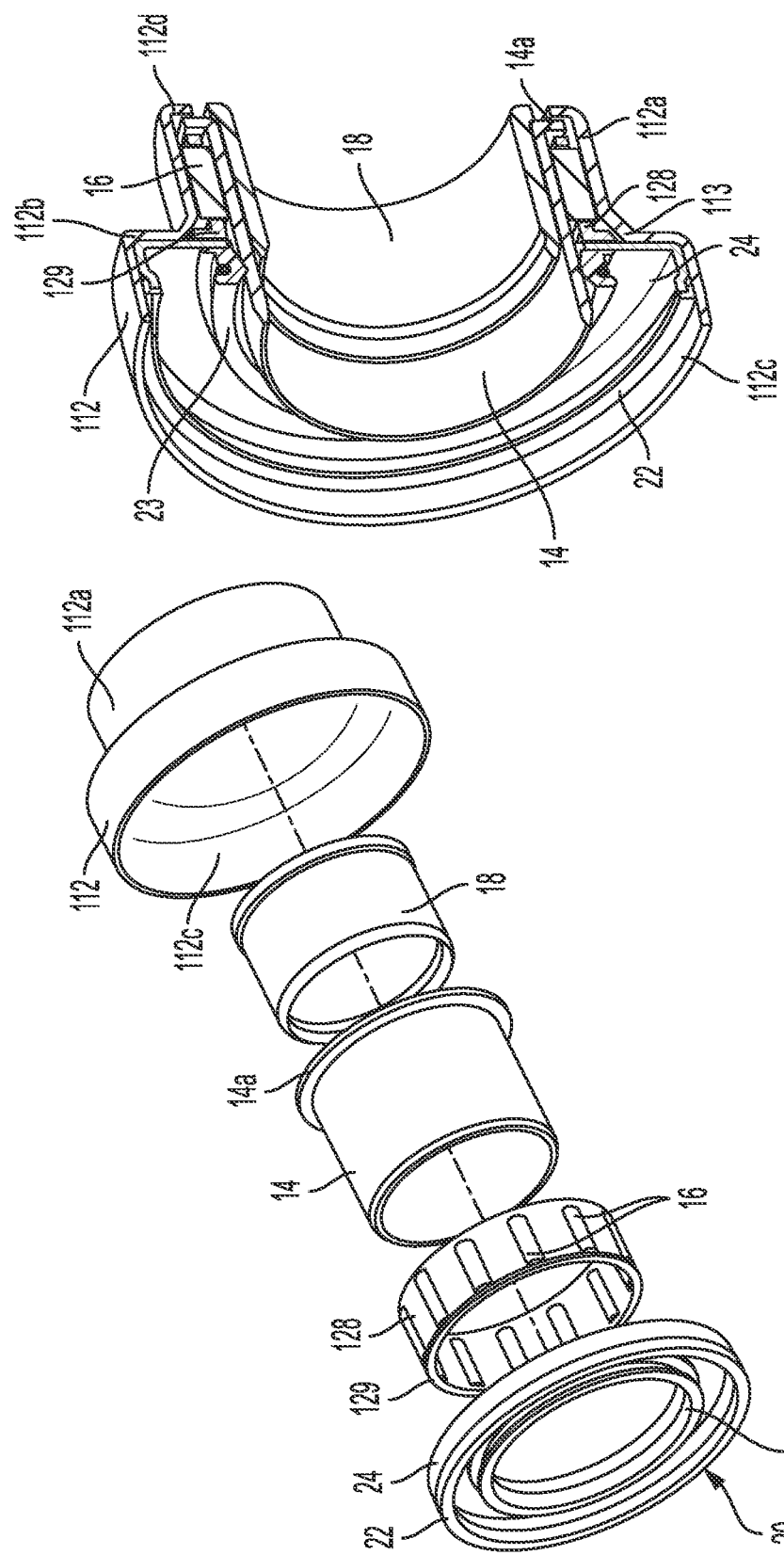

BEARING ASSEMBLY FOR ROLLER BOOT ARRANGEMENT

FIELD OF INVENTION

The present disclosure relates to a bearing assembly, and more specifically relates to a bearing assembly for a roller boot arrangement.

BACKGROUND

Roller boot arrangements can be used in differential applications, as is well known in the art. Referring to FIG. 1A, a differential assembly 1a is illustrated, along with a half-shaft 1b, a gear box housing 1c, a rubber boot 1d, a bearing assembly 1e, and tripod rollers 1f. FIG. 1B illustrates further details of the interface between a bearing assembly 2a and a rubber boot 2b. As shown in FIG. 1B, a cap 2c can be arranged around a half-shaft 2d and axially adjacent to the bearing assembly 2a. A clip band 2e can be provided for fixation of the rubber boot on the bearing assembly.

FIGS. 1C and 1D illustrate more detailed configurations for the bearing assembly in a rubber boot assembly. As shown in FIG. 1C, a seal assembly 3a is provided adjacent to a bearing 3b that includes spherical rolling elements. As shown in FIG. 1D, a seal assembly 4a is provided adjacent to a bearing 4b that includes needle rollers.

Based on the relative complexity of the seal assemblies and adjacent components in these rubber boot bearing assemblies, it can be time consuming and labor intensive to assemble each of the components. Specifically, it would be desirable to reduce the number of parts, while also ensuring that the bearing assembly components are sufficiently retained within the overall assembly.

SUMMARY

A bearing assembly is disclosed herein that can be configured for use in a roller boot arrangement. Specifically, the bearing assembly includes an outer ring, an inner ring, a plurality of rolling elements supported between the outer ring and the inner ring, and a cage configured to retain the plurality of rolling elements. A seal assembly is provided that comprises at least one sealing element and a seal insert that is configured to define a first axial stop face for the cage. Based on this arrangement, the seal assembly defines an axial stop face or abutment feature for the cage and the rolling elements. This eliminates the need for a separately formed retainer or retention component that is only designed to axially retain the cage and rolling elements.

The inner ring can include a radially outward flange configured to define a second axial stop face for the cage. One of ordinary skill in the art would understand that other components can be used to provide a second axial stop face that is opposite from the first axial stop face.

The cage can include a radial flange configured to contact the first axial stop face of the seal insert. The outer ring can include a slanted portion defining an interior space dimensioned to receive the radial flange of the cage. One of ordinary skill in the art would understand that the geometry of the outer ring can vary.

An inner sleeve can be arranged radially inward from the inner ring to provide additional support relative to a central shaft. The inner sleeve can include a radial flange configured to define a second axial stop face for the cage. The outer ring can include a radially inward flange, such that the radial flange of the inner sleeve is arranged between the cage and the radially inward flange of the outer ring.

A first sealing element can be provided that is in contact with a radially inner surface of the outer ring and the seal insert, and a second sealing element can be provided that is in contact with at least a radially outer surface of the inner ring and the seal insert.

The first and second sealing elements can be formed separately from each other. The second sealing element can be configured to contact a radially outward flange of the inner ring, in one embodiment.

The seal insert can directly contact at least one of the outer ring or the inner ring. The seal insert can have an interference fit with a radially inner surface of the outer ring. The seal insert can also be configured to directly abut a radial flange of the outer ring.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 3B is an exploded perspective view of the bearing assembly of FIG. 3A.

FIG. 3C is a perspective cross-sectional view of the bearing assembly of FIGS. 3A and 3B.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1A:
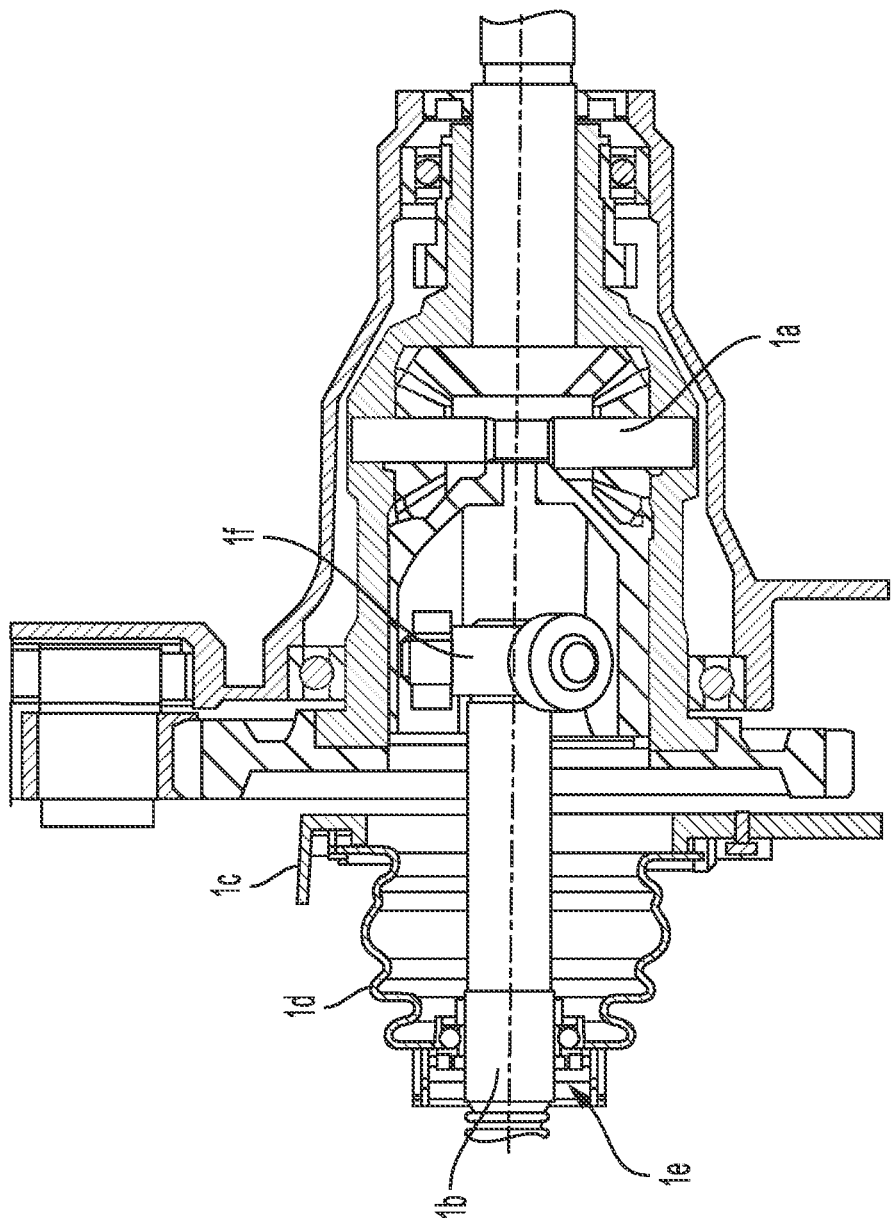
FIG. 1A is a cross-sectional view of an assembly including a differential and rubber boot assembly according to the prior art.
Figure 1B:
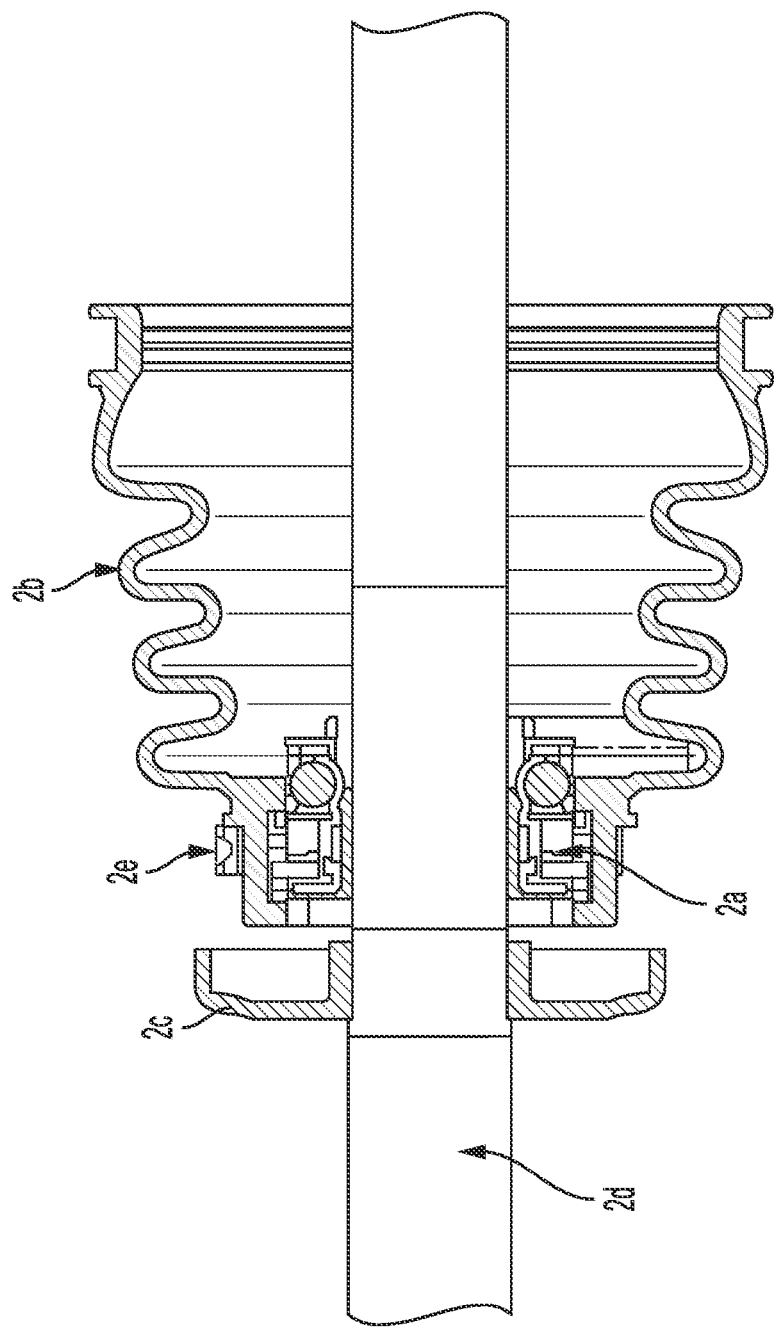
FIG. 1B is a cross-sectional view of a rubber boot assembly according to the prior art.
Figure 1C:
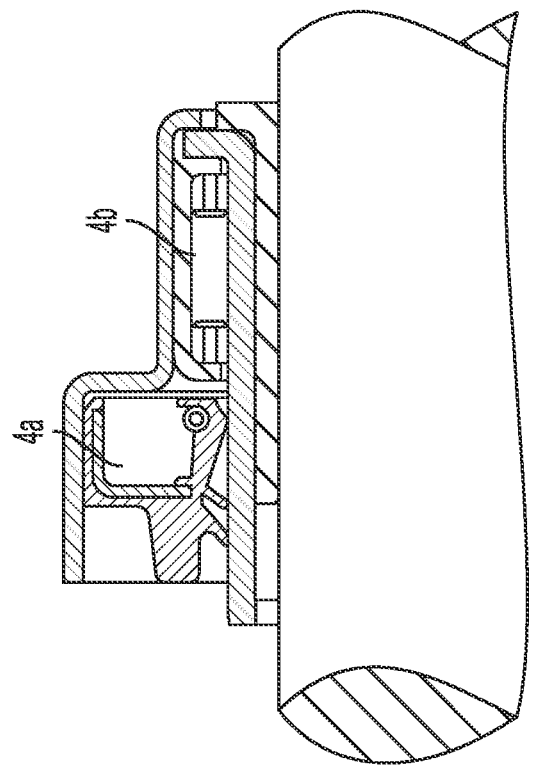
FIG. 1C is a cross-sectional view of a rubber boot bearing assembly including spherical rolling elements according to the prior art.
Figure 1D:
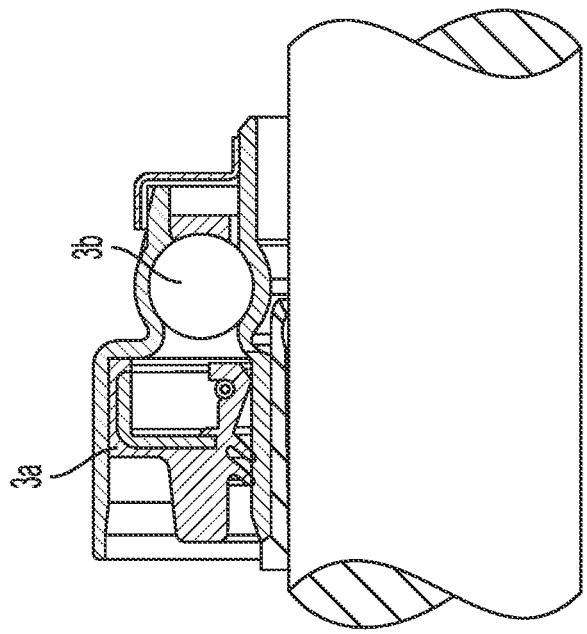
FIG. 1D is a cross-sectional view of a rubber boot bearing assembly including needle rollers according to the prior art.
Figure 2A:
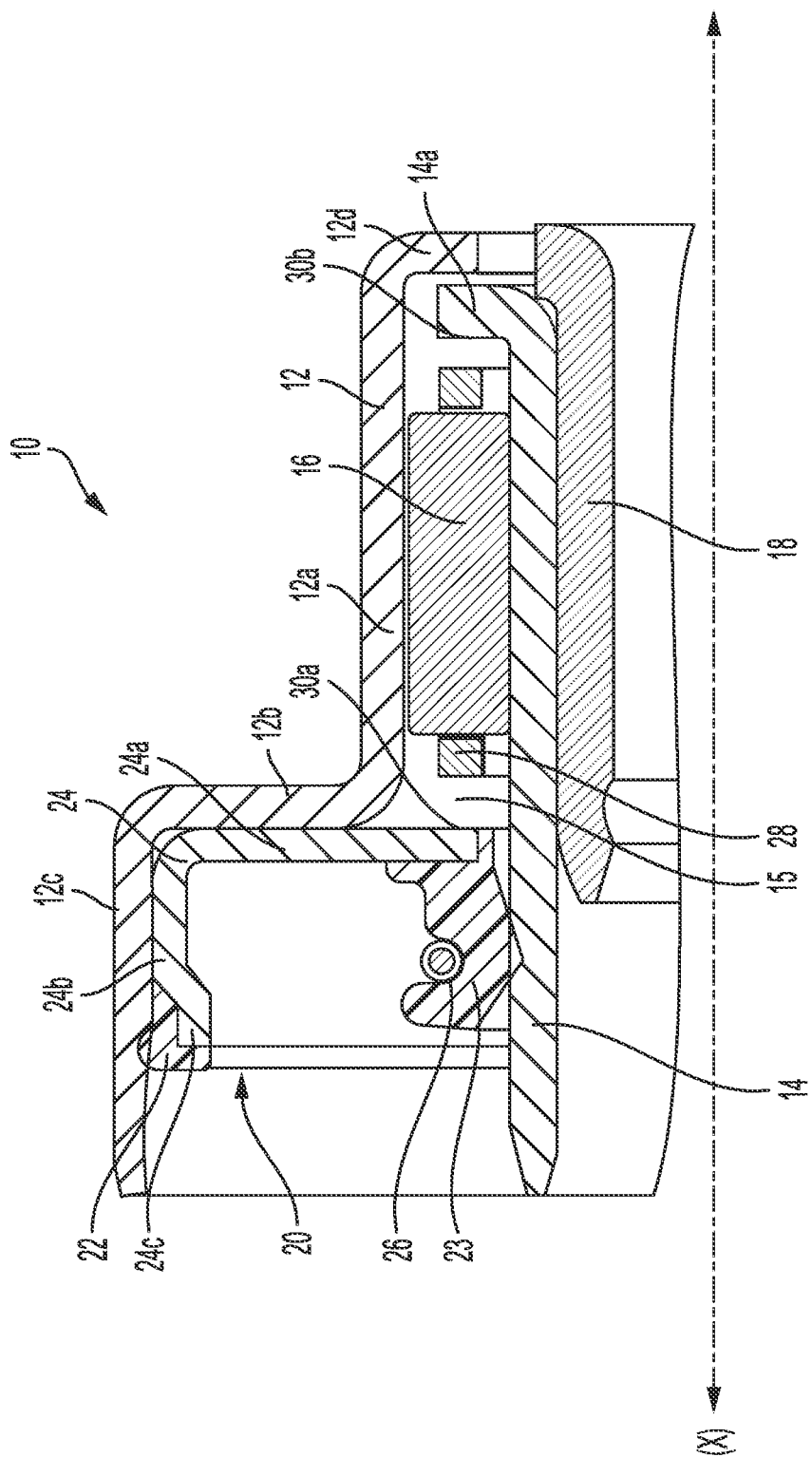
FIG. 2A is a cross-sectional view of a bearing assembly for a rubber boot assembly according to a first embodiment.
Figure 2B:
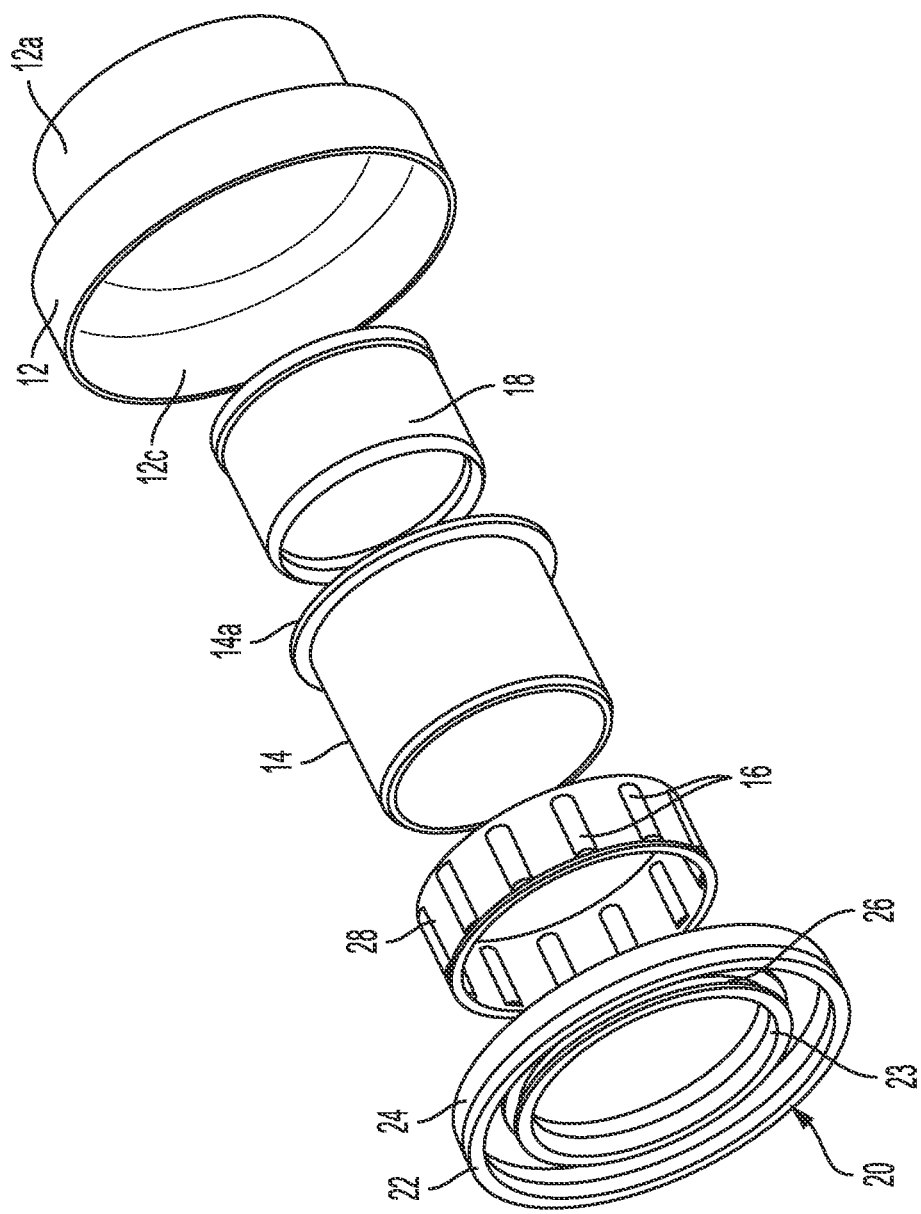
FIG. 2B is an exploded perspective view of the bearing assembly of FIG. 2A.
Figure 2C:
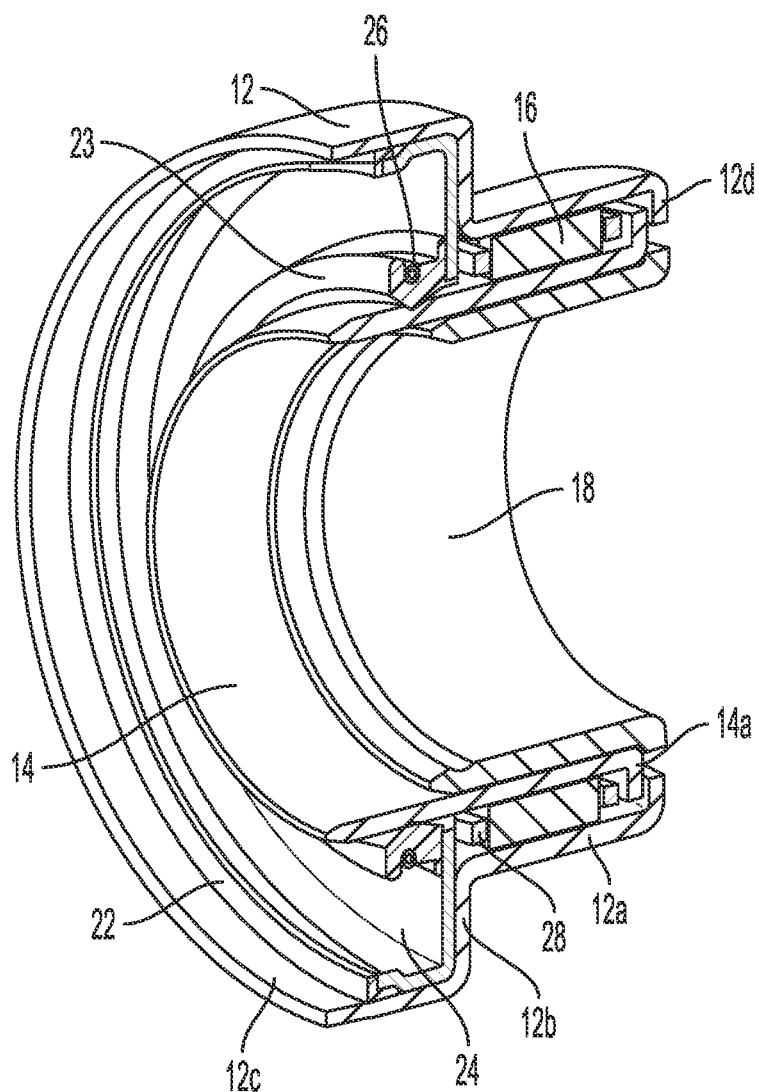
FIG. 2C is a perspective cross-sectional view of the bearing assembly of FIGS. 2A and 2B.

As shown in FIGS. 2A-2C a bearing assembly 10 for a roller boot arrangement is disclosed herein. The bearing assembly 10 generally includes an outer ring 12, an inner ring 14, rolling elements 16 supported between the outer ring 12 and the inner ring 14, and a cage 28 configured to retain the rolling elements 16. One of ordinary skill in the art would understand that the cage 28 can be omitted in some configurations or applications.

The outer ring 12 can generally include a first axial flange 12a, a first radial flange 12b, and a second axial flange 12c. The first radial flange 12b can be arranged in a medial position between the first axial flange 12a and the second axial flange 12c to define a connection flange. A second radial flange 12d can also be arranged on a terminal end of the first axial flange 12a.

The bearing assembly 10 can further include an inner sleeve 18, 118 arranged radially inward from the inner ring 14. The inner sleeve 18, 118 can be formed as a metallic component that is used to adjust the overall bearing inner diameter to an associated shaft diameter. The bearing assembly 10 can therefore be adapted for use with shafts of varying diameters. In this way, the inner sleeve 18, 118 can act as an adaptor type element that allows the bearing assembly to be mounted onto half shafts of varying diameters.

A seal assembly 20 is provided that generally is configured to retain oil for the gear box transmission system and bearing assembly 10. Specifically, the seal assembly 20 is configured to seal an oil retention pocket 15 that is configured to lubricate the rolling elements 16. The seal assembly 20 can comprise at least one sealing element 22, 23 and a seal insert 24. The sealing element 22, 23 can be formed from an elastomeric material or rubber material suitable to deform and provide a sealing interface with a respective contact surface. The seal insert 24 can be formed as a rigid component, such as a metallic component.

The seal assembly 20 can further include a biasing element 26 configured to engage with the second sealing element 23. The biasing element 26 can be formed as a helicoidal spring, in one example. The biasing element 26 can generally be configured to press or drive the second sealing element 23 radially inward to engage with the inner ring 14.

The seal insert 24 is configured to directly contact at least one of the outer ring 12 or the inner ring 14, and can be configured to directly contact two regions, areas, or points on one of the rings 12, 14. The seal insert 24 can have an L-shaped profiled and can include a radial flange 24a and an axial flange 24b. Preferably, the seal insert 24 is configured to directly contact the outer ring 12, and is configured to contact an interior surface of the second axial flange 12c and an interior surface of the first radial flange 12b. More preferably, the seal insert 24 is configured to have an interference or press fit with an interior surface of the outer ring 12. The seal insert 24 is also configured to define a first axial stop face 30a for the cage 28. As used in this context, the term "axial stop face" refers to an axial stopper or abutment such that the rolling elements 16 and the cage 28 are axially retained or limited in an axial direction. If the cage 28 is omitted, then the axial stop faces are configured to prevent axial movement of the rolling elements 16.

The at least one sealing element 22, 23 can include a first sealing element 22 in contact with both a radially inner surface of the outer ring 12 and the seal insert 24. The first sealing element 22 can be formed as an elastomeric sealing component that is over-molded or co-molded with the seal insert 24. The axial flange 24b of the seal insert 24 can include a bent portion 24c (i.e. offset from a remainder of the axial flange 24b) dimensioned to receive a portion of the first sealing element 22. The axial flange 24b of the seal insert 24 can be configured to provide an interference fit or press-fit with the second axial flange 12c of the outer ring 12. The radial flange 24a can be configured to directly contact the first radial flange 12b of the outer ring 12.

The at least one sealing element can also include a second sealing element 23 that is attached to the seal insert 24 and in contact with at least a radially outer surface of the inner ring 14. The second sealing element 23 can be over-molded or co-molded with the seal insert 24. The second sealing element 23 can define a pocket dimensioned to receive the biasing element 26.

As shown in FIGS. 2A-2C, the inner ring 14 can include a radially outward flange 14a configured to define a second axial stop face 30b for the rolling elements 16 and the cage 28.

Figure 3A:
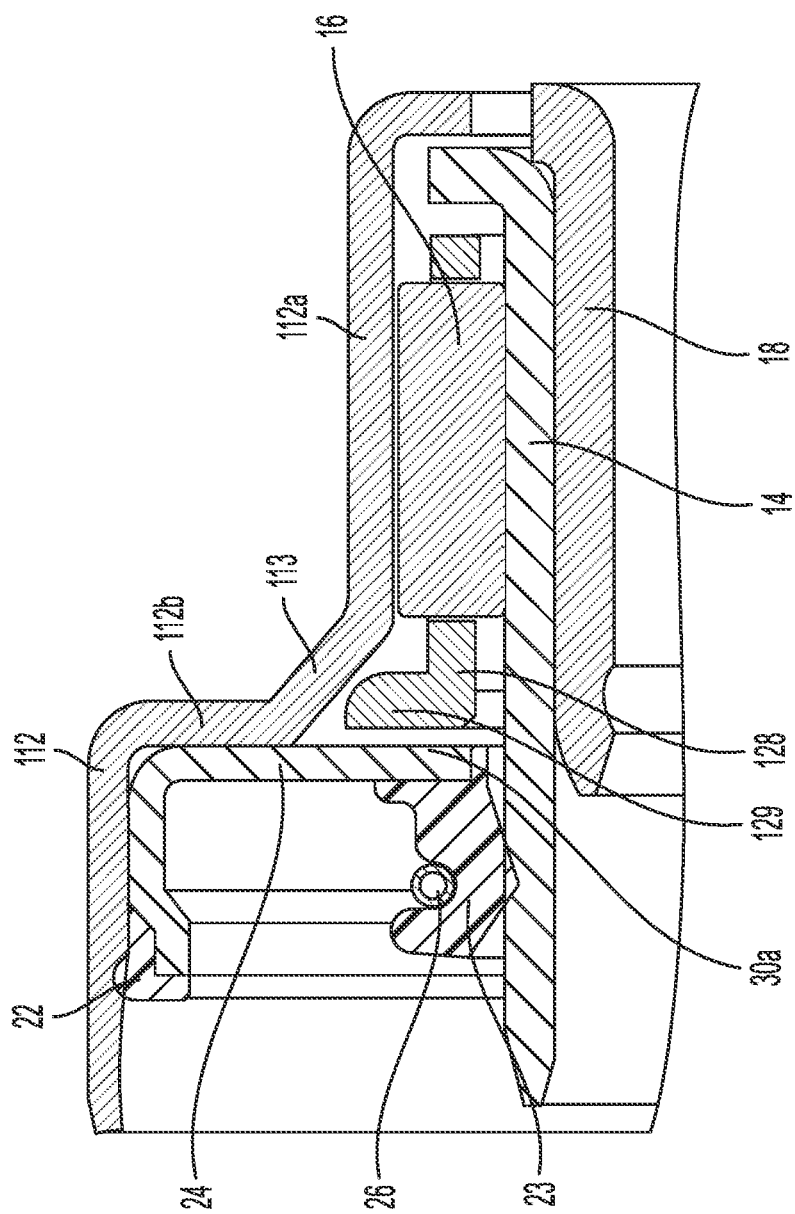
FIG. 3A is a cross-sectional view of a bearing assembly for a rubber boot assembly according to a second embodiment.

As shown in FIGS. 3A-3C, the cage 128 can include a radial flange 129 configured to contact the first axial stop face 30a of the seal insert 24. The radial flange 129 of the cage 128 can extend radially outward, and can extend radially beyond a radially outer surface of the rolling elements 16. Referring to FIGS. 3A-3C, the outer ring 112 can include a slanted portion 113 (i.e. angled or otherwise not extending in a purely radial or axial direction) defining an interior space dimensioned to receive the radial flange 129 of the cage 128. The slanted portion 113 of the outer ring 112 can be provided between a first axial flange 112a and a first radial flange 112b, and can connect these two portions of the outer ring 112. The outer ring 112 can include a second axial flange 112c and a second radial flange 112d.

Figure 4A:
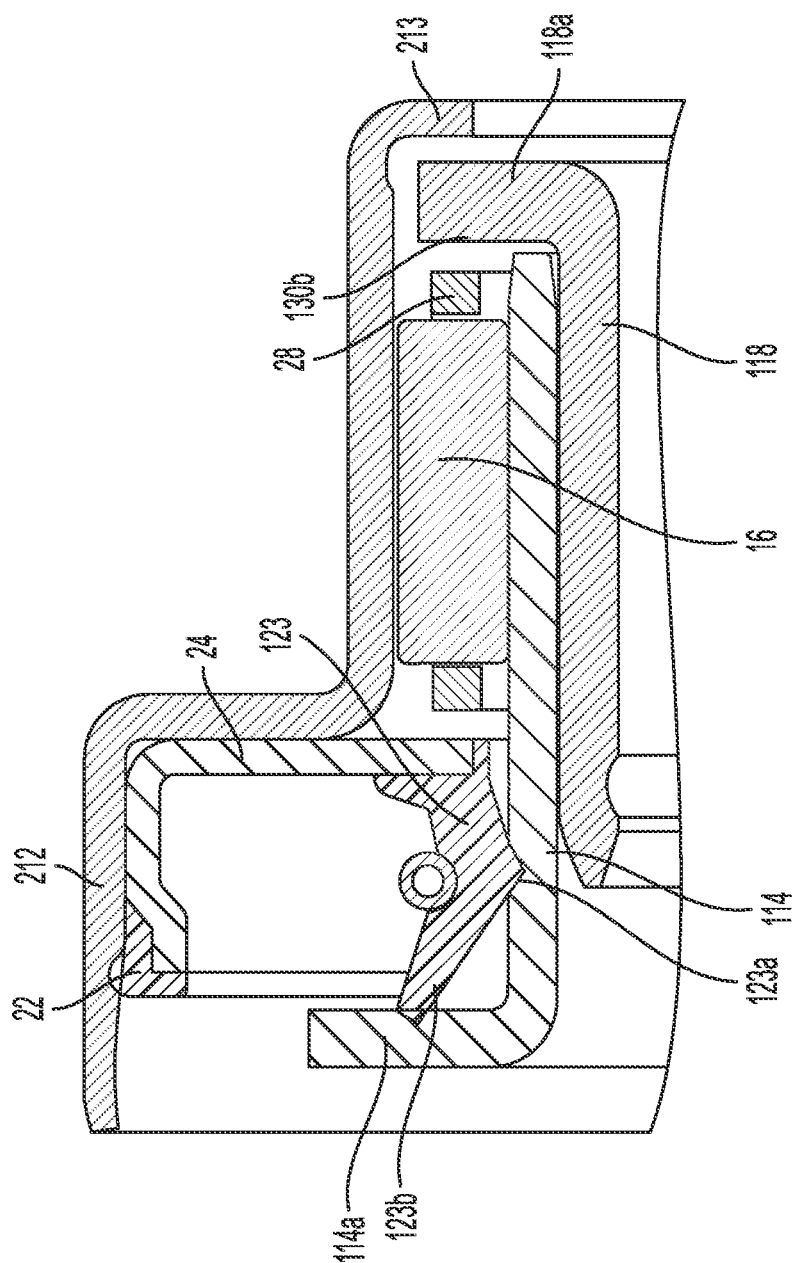
FIG. 4A is a cross-sectional view of a bearing assembly for a rubber boot assembly according to a third embodiment.
Figure 4C:
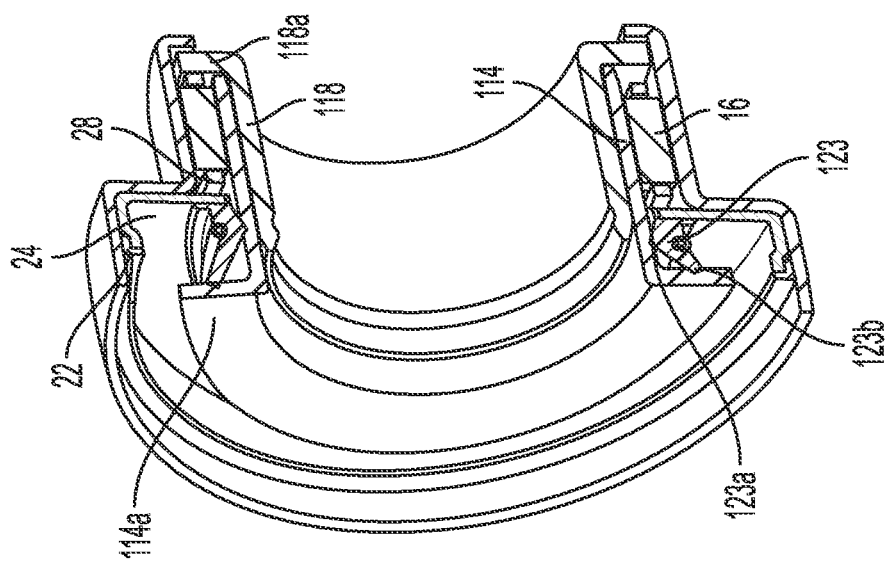
FIG. 4C is a perspective cross-sectional view of the bearing assembly of FIGS. 4A and 4B.
Figure 4B:
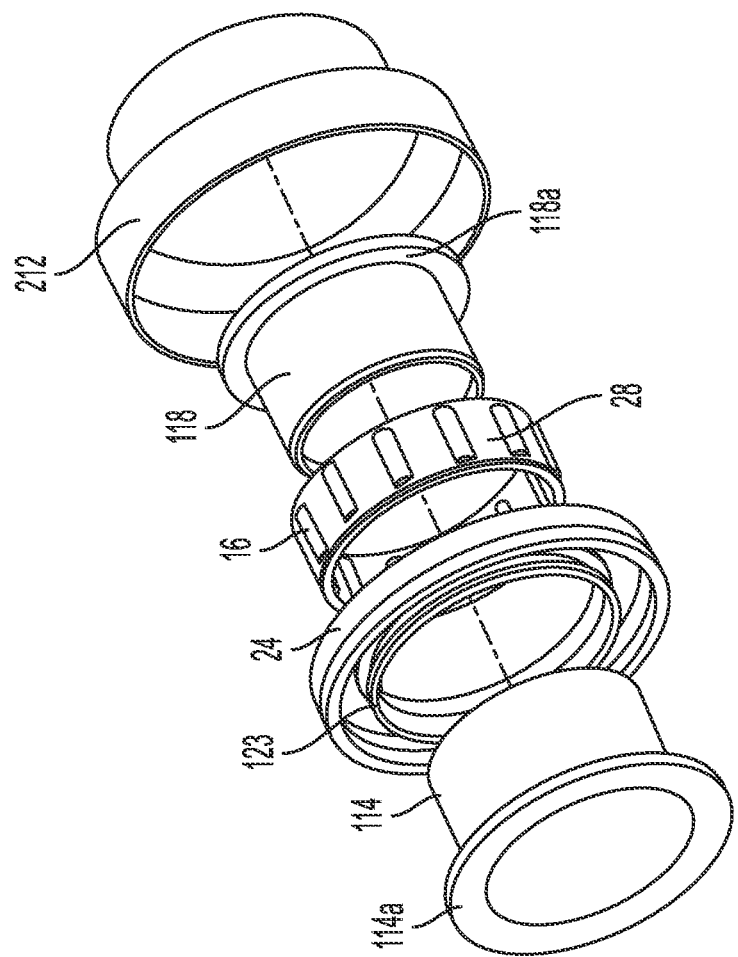
FIG. 4B is an exploded perspective view of the bearing assembly of FIG. 4A.

As shown in FIGS. 4A-4C, the second sealing element 123 can also be configured to contact a radially outward flange 114a of the inner ring 114. Referring to FIG. 4A, the second sealing element 123 includes a first sealing lip 123a configured to engage with a radially outer surface of the inner ring 114, and also includes a second sealing lip 123b configured to engage with an axial surface formed on the radially outward flange 114a of the inner ring 114.

Referring specifically to the configuration shown in FIGS. 4A-4C, the inner sleeve 118 can comprise a radial flange 118a configured to define a second axial stop face 130b for the cage 28 and the rolling elements 16. The outer ring 212 can include a radially inward flange 213 such that the radial flange 118a of the inner sleeve 118 is arranged between the cage 28 and the radially inward flange 213 of the outer ring 212.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS differential assembly 1a
half-shaft 1b
gear box housing 1c
rubber boot 1d
bearing assembly 1e
tripod rollers if
bearing assembly 2a
rubber boot 2b
cap 2c
half-shaft 2d
clip band 2e
seal assembly 3a
bearing 3b
seal assembly 4a
bearing 4b
bearing assembly 10
outer ring 12, 212
first axial flange 12a, 112a
first radial flange 12b, 112b
second axial flange 12c, 112c
second radial flange 12d
inner ring 14, 114
radially outward flange 14a of inner ring
oil retention pocket 15
rolling elements 16
inner sleeve 18
seal assembly 20
first sealing element 22
second sealing element 23
seal insert 24
radial flange 24a of seal insert
axial flange 24b of seal insert
bent portion 24c of seal insert
biasing element 26
cage 28, 128
first axial stop face 30a for cage and rolling elements
second axial stop face 30b for cage and rolling elements
radial flange 42 of inner sleeve
slanted portion 113 of outer ring
first sealing lip 123a
second sealing lip 123b
radial flange 129 of cage
second axial stop face 130b of inner sleeve
radially inward flange 213

What is claimed is:

1. A bearing assembly comprising:
    an outer ring, an inner ring, a plurality of rolling elements supported between the outer ring and the inner ring, and a cage configured to retain the plurality of rolling elements; and
    a seal assembly comprising at least one sealing element and a seal insert that is configured to define a first axial stop face for the cage;
    wherein the inner ring includes a radially outward flange configured to define a second axial stop face for the cage.

2. The bearing assembly according to claim 1, wherein the cage includes a radial flange configured to contact the first axial stop face of the seal insert.

3. The bearing assembly according to claim 2, wherein the outer ring includes a slanted portion defining an interior space dimensioned to receive the radial flange of the cage.

4. The bearing assembly according to claim 1, wherein the at least one sealing element includes a first sealing element in contact with a radially inner surface of the outer ring and the seal insert, and a second sealing element in contact with at least a radially outer surface of the inner ring and the seal insert.

5. The bearing assembly according to claim 4, wherein the first and second sealing elements are formed separately from each other.

6. The bearing assembly according to claim 4, wherein the second sealing element is configured to contact a radially outward flange of the inner ring.

7. The bearing assembly according to claim 1, wherein the seal insert directly contacts at least one of the outer ring or the inner ring.

8. The bearing assembly according to claim 7, wherein the seal insert has an interference fit with a radially inner surface of the outer ring.

9. The bearing assembly according to claim 7, wherein the seal insert abuts a radial flange of the outer ring.

10. A bearing assembly comprising:
    an outer ring, an inner ring, a plurality of rolling elements supported between the outer ring and the inner ring, a cage configured to retain the plurality of rolling elements;
    a seal assembly comprising at least one sealing element and a seal insert that is configured to define a first axial stop face for the cage; and
    an inner sleeve arranged radially inward from the inner ring, the inner sleeve comprising a radial flange configured to define a second axial stop face for the cage.

11. The bearing assembly according to claim 10, wherein the outer ring includes a radially inward flange, such that the radial flange of the inner sleeve is arranged between the cage and the radially inward flange of the outer ring.

12. A bearing assembly comprising:
    a plurality of rolling elements configured to be supported between an outer ring and an inner ring, and a cage configured to retain the plurality of rolling elements; and
    a seal assembly configured to define sealing contact with the outer ring and the inner ring, the seal assembly including a seal insert that (i) partially defines an oil retention pocket adjacent to the plurality of rolling elements and the cage and (ii) defines a first axial stop face for the cage;
    wherein the seal insert includes a first and a second sealing element on opposite terminal ends of the seal insert, and the seal insert is configured to directly contact the outer ring in regions between the opposite terminal ends.

13. The bearing assembly according to claim 12, wherein the seal insert is configured to have an interference fit with a radially inner surface of the outer ring, and the seal insert is configured to abut a radial flange of the outer ring.

14. The bearing assembly according to claim 12, wherein the seal assembly includes at least one sealing element comprising the first sealing element configured to seal against a radially inner surface of the outer ring, and the second sealing element configured to seal against a radially outer surface of the inner ring.

15. The bearing assembly according to claim 12, wherein the cage includes a radial flange configured to contact the first axial stop face of the seal insert, wherein the radial flange projects radially outward beyond the plurality of rolling elements.

16. The bearing assembly according to claim 15, wherein the outer ring includes a slanted portion defining an interior space dimensioned to receive the radial flange of the cage.

17. The bearing assembly according to claim 12, wherein the outer ring is configured to define an outer raceway for the plurality of rolling elements and an engagement surface for an interference fit with the seal insert.

18. The bearing assembly according to claim 12, wherein the seal insert comprises a radial flange that is configured to contact the outer ring and defines the first axial stop face for the cage.

\* \* \* \* \*